(12) United States Patent
Chen et al.

(10) Patent No.: US 7,089,017 B2
(45) Date of Patent: Aug. 8, 2006

(54) RESOURCE CONTROL METHOD, MOBILE COMMUNICATION SYSTEM, BASE STATION AND MOBILE STATION

(75) Inventors: Lan Chen, Yokohama (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 344 days.

(21) Appl. No.: 10/260,424

(22) Filed: Oct. 1, 2002

(65) Prior Publication Data

US 2003/0064730 A1    Apr. 3, 2003

(30) Foreign Application Priority Data

Oct. 1, 2001    (JP)    ............................ P2001-305700

(51) Int. Cl.
*H04Q 7/20*    (2006.01)
(52) U.S. Cl. .................. 455/453; 455/452.2; 455/436; 455/442; 455/439; 455/450; 455/422.1; 370/331; 370/332; 370/328; 370/329
(58) Field of Classification Search ................ 455/453, 455/456.1, 456.2, 456.3, 452.2, 436, 442, 455/435.3, 435.2, 422.1, 452.1, 439, 450; 370/468, 322, 329, 331, 332, 328

See application file for complete search history.

(56) References Cited

U.S. PATENT DOCUMENTS

| | | | |
|---|---|---|---|
| 5,488,609 A | | 1/1996 | Hluchyj et al. |
| 5,615,121 A | * | 3/1997 | Babayev et al. ................ 705/9 |
| 6,240,079 B1 | | 5/2001 | Hämäläinen et al. |
| 6,324,403 B1 | * | 11/2001 | Jalloul ........................ 455/453 |
| 6,366,780 B1 | * | 4/2002 | Obhan ........................ 455/453 |
| 6,418,148 B1 | * | 7/2002 | Kumar et al. ............... 370/468 |
| 6,498,786 B1 | * | 12/2002 | Kirkby et al. .............. 370/322 |
| 6,571,101 B1 | * | 5/2003 | Schulz ........................ 455/450 |
| 6,788,943 B1 | * | 9/2004 | Hamalainen et al. ....... 455/450 |

(Continued)

FOREIGN PATENT DOCUMENTS

EP    0 932 280    7/1999

(Continued)

*Primary Examiner*—Sonny Trinh
*Assistant Examiner*—Khai Nguyen
(74) *Attorney, Agent, or Firm*—Oblon, Spivak, McClelland, Maier & Neustadt, P.C.

(57) ABSTRACT

To provide a service with fairness by providing QoS of approximately an equal degree among users of the same service class to keep fairness of the service as well as by maintaining a transmission rate at a predetermined ratio among users of different service classes to relatively keep QoS among service classes. A resource control method which is executed by a base station in a mobile communication between the base station and each of a plurality of mobile stations, the method comprising: an unallocated resource measurement step of measuring an amount of unallocated resources, when one mobile station originates a new connection request or a handover request; a service quality calculation step of calculating a service quality which can be provided to the one mobile station with the amount of the unallocated resources obtained by the measurement; a decision step of deciding whether the service quality obtained by the calculation is within a predetermined range in accordance with a service class to which the one mobile station belongs; and a reassignment step for reassigning the resources to each mobile station depending on the service class to which each mobile station belongs, when the service quality is not within the predetermined range in accordance with the service class to which the one mobile station belongs.

13 Claims, 12 Drawing Sheets

U.S. PATENT DOCUMENTS

| | | | |
|---|---|---|---|
| 6,901,259 B1 * | 5/2005 | Dorenbosch | 455/453 |
| 2001/0053694 A1 * | 12/2001 | Igarashi et al. | 455/433 |
| 2002/0058532 A1 * | 5/2002 | Snelgrove et al. | 455/557 |
| 2002/0183039 A1 * | 12/2002 | Padgett et al. | 455/406 |
| 2003/0032433 A1 * | 2/2003 | Daniel et al. | 455/452 |
| 2003/0148774 A1 * | 8/2003 | Naghian et al. | 455/456 |
| 2004/0107281 A1 * | 6/2004 | Bose et al. | 709/226 |
| 2004/0203657 A1 * | 10/2004 | Koskelainen | 455/414.1 |

FOREIGN PATENT DOCUMENTS

| | | |
|---|---|---|
| EP | 1 039 699 | 9/2000 |
| EP | 1 119 213 | 7/2001 |
| JP | 1162379 A | 10/1997 |
| JP | 2001-177865 | 6/2001 |

* cited by examiner

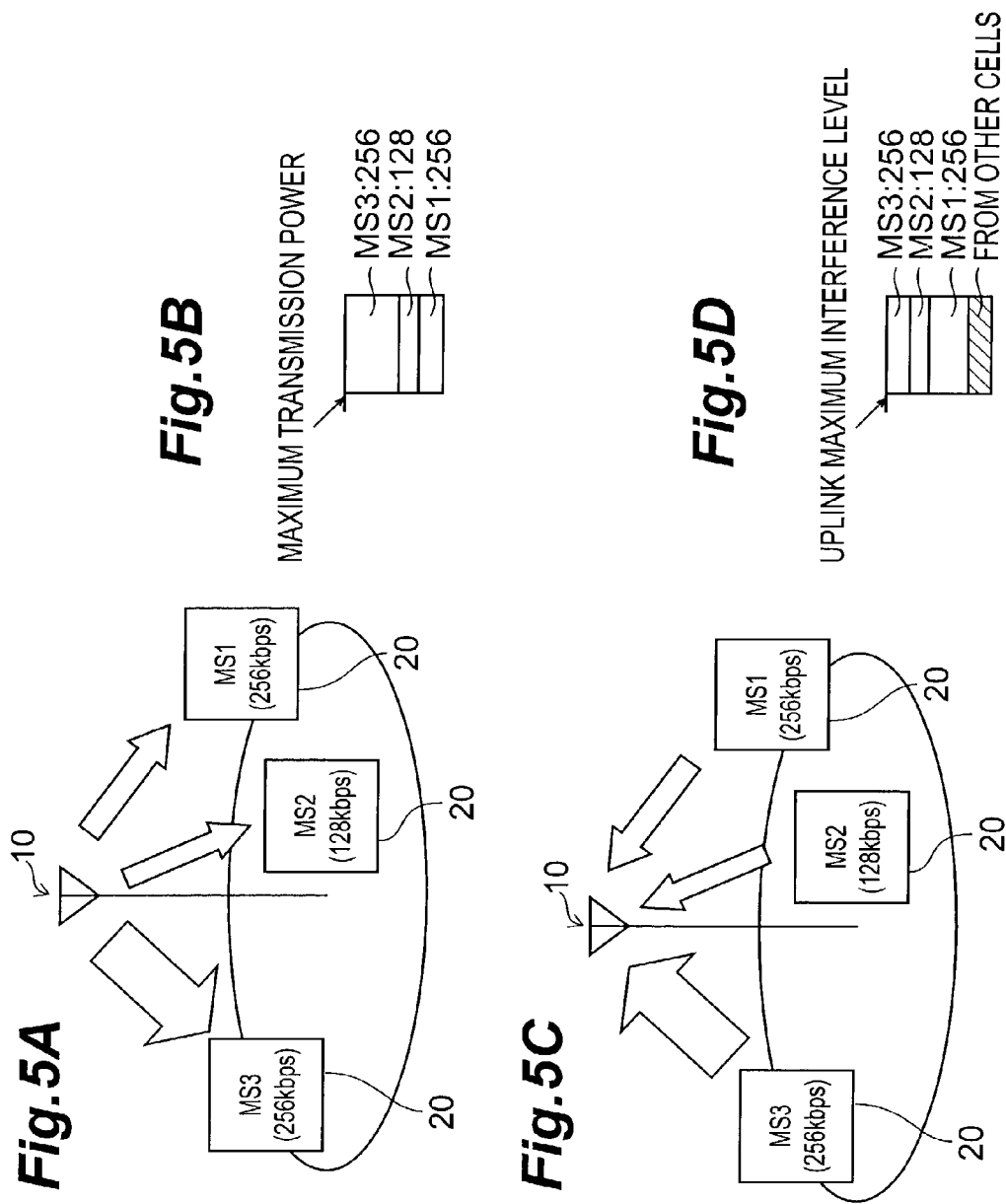

Fig.11

|  | QoS MINIMUM REQUEST AMOUNT | QoS MAXIMUM REQUEST AMOUNT |
|---|---|---|
| CLASS 1 | 1Mbps | 3Mbps |
| CLASS 2 | 2Mbps | 6Mbps |

Fig.12A

|  | CLASS 1 |  | CLASS 2 |
|---|---|---|---|
| USER | A | C(NEW) | B |
| ORDER OF ORIGINATING | 1 | 3 | 2 |
| TRANSMISSION RATE | 3Mbps | 1Mbps | 6Mbps |
| NUMBER OF CODES | 6 | 2 | 12 |

Fig.12B

|  | CLASS 1 |  | CLASS 2 |
|---|---|---|---|
| USER | A | C(NEW) | B |
| ORDER OF ORIGINATING | 1 | 3 | 2 |
| TRANSMISSION RATE | 2.5Mbps | 2.5Mbps | 5Mbps |
| NUMBER OF CODES | 5 | 5 | 10 |

Fig.13A

|  | CLASS 1 | | CLASS 2 | |
|---|---|---|---|---|
| USER | A | C | B | D |
| ORDER OF ORIGINATING | 1 | 3 | 2 | 4 |
| TRANSMISSION RATE | 1.5Mbps | 1.5Mbps | 3Mbps | 3Mbps |
| NUMBER OF CODES | 3 | 3 | 6 | 6 |

Fig.13B

|  | CLASS 1 | CLASS 2 | |
|---|---|---|---|
| USER | C | B | D |
| ORDER OF ORIGINATING | 3 | 2 | 4 |
| TRANSMISSION RATE | 2Mbps | 4Mbps | 4Mbps |
| NUMBER OF CODES | 4 | 8 | 8 |

Fig.14A

|  | CLASS 1 | | CLASS 2 | |
|---|---|---|---|---|
| USER | A | C | B | D |
| ORDER OF ORIGINATING | 1 | 3 | 2 | 4 |
| TRANSMISSION RATE | 1Mbps | 1Mbps | 3Mbps | 3Mbps |
| NUMBER OF CODES | 2 | 2 | 6 | 6 |

Fig.14B

|  | CLASS 1 | | CLASS 2 | |
|---|---|---|---|---|
| USER | A | C | B | D |
| ORDER OF ORIGINATING | 1 | 3 | 2 | 4 |
| TRANSMISSION RATE | 1.5Mbps | 1.5Mbps | 3Mbps | 3Mbps |
| NUMBER OF CODES | 3 | 3 | 6 | 6 |

RESOURCE CONTROL METHOD, MOBILE COMMUNICATION SYSTEM, BASE STATION AND MOBILE STATION

BACKGROUND OF THE INVENTION

1. Field of the Invention

The present invention relates to a resource control method in a mobile communication system between a base station and a plurality of mobile stations, the base station, the mobile stations and a mobile communication system including the base station and the mobile stations.

2. Related Background Art

In mobile communication environments, variations in a receiving level and an amount of interference are extremely depending on the movement of terminals and the changes of radio wave environments, and variations in an amount of resources such as a radio channel necessary for a communication are large. In a cellular system, an amount of resources available for each cell varies, and, by a handover due to the movement of the terminal, the resource that can be used by terminals changes as time passes. Accordingly, it is difficult to absolutely guarantee so-called QoS (a quality of service for a network) such as an error rate and a transmission speed all over the time of communications, which is allocated when the terminal originates a new connection request and handover request.

In a conventional quality guarantee service, e.g., in a circuit-switched voice service in the mobile communication, when initially required QoS becomes unfulfilled because of a decrease in a receiving level and an increase in interference during the communication and because of inexistence of a non-busy channel in a handover destination when a handover is performed, in other words, when it is impossible to keep voice QoS a certain predetermined level, the communication has been stopped at that time. For users, the cut-off of the communication desired to be continued is a large loss in a service.

On the other hand, in the invention titled as "A Slot Allocation Method in Mobile Communication, Base Station using the Method, and Mobile Stations using the Method", which is disclosed in Japanese Patent Laid-Open No. 2001-177865, each user notifies to a network a QoS request in which two values composed of the maximum and minimum of resources required are included. When a new connection request is originated, the network checks allocatable resources, and the resources are utilized within the range between an amount of the maximum requested resources and an amount of the minimum requested resources of the connection request.

However, in this method the resources are allocated depending on a traffic state at the time when a new connection request or a handover request is originated. Accordingly, when a plurality of service classes exist, if the times of issuing connection requests by a plurality of users of the same service class are different from each other, unfairness may occur among users of the same service class. Specifically, the unfairness occurs if the maximum request resources are allocated to the user issuing the request in non-congested condition and the minimum request resources are allocated to the user issuing the request in congested condition.

Among the users of different service classes, the users of a low priority service class who originate the request in non-congested condition, are sometimes allocated with the maximum request resource amount, and the users of a high priority service class who originate the request in congested condition, are sometimes allocated with the minimum request resource amount. Accordingly, unfairness occurs for these users of the different service classes. Existence of the unfairness among the users of the same service class and different service classes makes it impossible to provide service with fairness, and may deteriorate a degree of satisfaction of users.

For example, as shown in FIGS. 7A to 7D, mobile stations (hereinafter referred to as MS) MS1 and MS3 shall belong to a high service class demanding a high transmission rate, and a MS2 shall belong to a low service class demanding a low transmission rate. Note that FIG. 7A shows a communication from a base station to each mobile station and FIG. 7C shows a communication from the mobile station to the base station.

The thickness of the arrow in FIG. 7A indicates a magnitude of transmission power allocated to each MS, and a stacking graph of the transmission power allocated to each MS is shown in FIG. 7B. The thickness of the arrow in FIG. 8A described later similarly shows a magnitude of transmission power, and FIG. 8B described later similarly shows a stacking graph of the transmission power. Moreover, the thickness of the arrow in FIG. 7C indicates a magnitude of received power relating to a received signal from each MS, and a stacking graph of the received power from each MS is shown in FIG. 7D. The thickness of the arrow in FIG. 8C described later similarly shows the magnitude of the received power, and FIG. 8D described later shows the stacking graph of the received power similarly.

As shown in FIGS. 7A to 7D, when the MS1 and MS2 originated a new connection request, there was a margin of resources. Accordingly, the resources were allocated to the MS1 and MS2 for the maximum request of QoS. For example, the resources were allocated to the MS1 and MS2 so that transmission rates of 384 kbps and 192 kbps could be realized.

However, when the MS3 originates a new connection request in this state, the remaining transmission power resource is small. Accordingly, the transmission rate as little as 64 kbps can be provided to the MS3. Therefore, unfairness occurs in the service provided to the MS1 and MS3 that are users of the same service class. 64 kbps is allocated to the MS3 of a high service class and 192 kbps is allocated to the MS2 of a low service class. Thus, unfairness occurs also in the service provided to the MS2 and MS3 that are users of the different service classes.

Such a state may occur also when the handover request is originated. Specifically, as shown in FIGS. 8A to 8D, since there was a margin of the resources when the MS1 and MS2 originated the handover request, the resources were allocated to the MS1 and MS2 for the maximum request of QoS. For example, the resources were respectively allocated to the MS1 and MS2 so that the transmission rates of 384 kbps and 384 kbps could be realized.

However, when the MS3 originates the handover request in this state, the remaining transmission power resource is small. Accordingly, the transmission rate as little as 32 kbps can be provided to the MS3. Therefore, unfairness occurs in the service provided to the MS1 and MS3 that are the users of the same service class. 32 kbps is allocated to the MS3 of the high service class, and 384 kbps is allocated to the MS2 of the low service class. Thus, unfairness occurs also in the service provided to the MS2 and the MS3 that are the users of the different service classes.

As described above, services cannot be provided with fairness by the conventional method, and the conventional method may deteriorate a degree of satisfaction of users.

In the foregoing conventional resource control method, the maximum request resource is allocated to the user issuing the new connection request or the handover request in non-congested condition, and the minimum request resource is allocated to the user issuing the new connection request or the handover request in congested condition. In such a case, unfairness occurs in the service among the users of the same service class.

Furthermore, the maximum request resource is allocated to the user of the low priority class issuing the new connection request or the handover request in non-congested condition, and the minimum request resource is allocated to the user of the high priority class issuing the new connection request or the handover request in congested condition. In such a case, unfairness occurs in the service among the users of the different service classes.

Existence of the unfairness among the users of the same service class and among the users of the different services makes it impossible to provide high-cost performance services. Therefore, there was a drawback that improvement in a degree of satisfaction of users is difficult.

SUMMARY OF THE INVENTION

Accordingly, the present invention was made to solve the foregoing subjects, and an object of the present invention is to provide a resource control method, a mobile communication system, a base station and a mobile station, which are capable of keeping fairness of a service by providing QoS of approximately an equal degree to users of the same service class, and capable of providing a service with fairness which can relatively keep QoS among the service classes by maintaining a rate between transmission rates for the different service classes, to a previously determined rate.

To achieve the foregoing object, the resource control method according to the present invention is the one in a mobile communication between a base station and each of a plurality of mobile stations, wherein in a case where a new connection request or a handover request is originated and in a case where unallocated resources necessary for the communication are short, the base station reassigns resources which have been allocated to the respective mobile stations, depending on states among mobile stations of the same service class or among mobile stations of the different service classes.

The "resource" in this case means resources of the base station exclusively allocated to the individual mobile stations in communicating with the respective mobile station, which include transmission power necessary for providing a certain communication quality or QoS (a transmission rate, a delay, an error rate and the like), buffer capacitance, and the like. Moreover, "a certain communication quality" means a communication quality which neither increases nor decreases by a predetermined rate relative to a communication quality provided to other users of the same service class, or a communication quality which neither increases nor decreases by a predetermined rate relative to a communication quality provided to users of other service classes.

Specifically, in the present invention, the case where the unallocated resources are short means that the unallocated resources increase or decrease by a predetermined rate relative to resources that have been allocated to the mobile stations of the same class or the mobile stations of the different service classes.

In addition, in the present invention, a constitution should be preferably adopted, in which the base station adjusts a degree of fairness among the mobile stations of the same service class or among the mobile stations of the different service classes by adjusting the predetermined rate.

Moreover, the present invention should be preferably constituted so that the base station estimates a transmission rate capable of being provided to the mobile station as the unallocated resource that can be allocated to the mobile station.

On the other hand, the resource control method according to the present invention may be constituted as follows. Specifically, the resource control method according to the present invention is a resource control method in a mobile communication between a base station and each of a plurality of mobile stations, wherein, at certain time intervals or in a case where some resources are released, and in a case where resources need to be reassigned, the base station reassigns the resources that have been allocated to the respective mobile stations, depending on states among mobile stations of the same service class or among mobile stations of the different service classes.

Herein, the case where the reassignment of the resources is necessary means that resources allocated to the mobile stations of a predetermined ratio or more among the mobile stations increase or decrease by a predetermined rate relative to resources allocated to the mobile stations of the same service class or the mobile stations of the different service classes.

The present invention should preferably have a constitution, in which the base station adjusts a degree of fairness among the mobile stations of the same service class or among the mobile stations of the different service classes by adjusting both of the predetermined rate and the predetermined ratio, or by adjusting one of the predetermined rate and the predetermined ratio.

The present invention should preferably have a constitution, in which the base station reassigns the resources so that the resources, which have been allocated to the respective mobile stations belonging to the same service class, are within a predetermined range.

The present invention should preferably have a constitution, in which the base station reassigns the resources so that service qualities provided by the resources allocated to the respective mobile stations belonging to the different service classes are at a predetermined relative rates.

According to the resource control method of the present invention constituted as described above, the resources are reassigned depending on the service class to which the user belongs, and even when the total traffic capacitance varies, fairness of a service is kept by providing the resources of approximately the equal degree among the users of the same service class, and differentiation among the users of the different service classes is kept by maintaining a previously determined rate. Thus, the service with fairness can be provided.

As described above, by achieving the fairness for the users of the same service class and the users of the different service classes, the service with fairness can be provided and a degree of user satisfaction can be enhanced. Particularly, in a handover between a cell of the third generation mobile communication system showing a large capacitance difference (hereinafter referred to as "3G cell" and drawn similarly in the figure) and a cell of the fourth generation mobile communication system (hereinafter referred to as "4G cell" and drawn similarly in the figure), it is possible to reduce a quality difference among the users of the same class.

The present invention according to the foregoing resource control method can be described as an invention of a mobile communication system and a base station as follows.

Specifically, the mobile communication system according to the present invention is a mobile communication system constituted by including a base station and a plurality of mobile stations located in a cell controlled by the base station, communicating with the base station, wherein in a case where a new connection request or a handover request is originated and in a case where unallocated resources necessary for the communication are short, the base station reassigns resources that have been allocated to the respective mobile stations, depending on states among mobile stations of the same service class or among mobile stations of the different service classes.

Furthermore, a mobile communication system according to the present invention is a mobile communication system constituted by including a base station and a plurality of mobile stations located in a cell controlled by the base station, communicating with the base station, wherein in a case where some resources are released or at certain time intervals, and in a case where reassignment of resources is necessary, the base station reassigns resources that have been allocated to the respective mobile stations, depending on states among mobile stations of the same service class or among mobile stations of the different service classes.

A base station according to the present invention is a base station which communicates with each of a plurality of mobile stations located in a cell, wherein in a case where a new connection request or a handover request is originated and in a case where unallocated resources necessary for the communication are short, the base station reassigns resources that have been allocated to the respective mobile stations, depending on states among mobile stations of the same service class or among mobile stations of the different service classes.

Furthermore, a base station according to the present invention is a base station which communicates with each of a plurality of mobile stations located in a cell, wherein in a case where some resources are released or at certain time intervals, and in a case where reassignment of resources is necessary, the base station reassigns resources that have been allocated to the respective mobile stations, depending on states among mobile stations of the same service class or among mobile stations of the different service classes.

Focusing on an operation between the base station and each mobile station in the mobile communication system, the base station according to the present invention and the mobile station according to the present invention can be described as follows.

Specifically, the base station according to the present invention is a base station which communicates with each of a plurality of mobile stations located in a cell, the base station comprising recognition means for recognizing a present service quality and a service class for a communicating mobile station; estimation means for estimating an amount of resources necessary for performing transmission/reception to/from the mobile station at a certain transmission rate; determination means for determining an amount of resources and a transmission rate to be allocated to the mobile station, based on the service class of the mobile station, the present service quality and the estimated amount of resources; and instruction means for instructing the amount of resources and the transmission rate, which are determined, to the mobile station.

Furthermore, a mobile station according to the present invention is a mobile station which communicates with a base station, the mobile station comprising: class notification means for notifying to the base station a service class to which the mobile station belongs; service quality measurement means for measuring a present service quality at the time of a new connection, at the time of a handover and at certain time intervals; service quality notification means for notifying the service quality obtained by the measurement to the base station; recognition means for recognizing an amount of resources and a transmission rate, which are instructed by the base station; and communication means for communicating with the base station based on the amount of resources and the transmission rate, which are instructed.

Incidentally, the resource control method according to the present invention can be described as a resource control method comprising a plurality of steps as follows.

Specifically, the resource control method according to the present invention is a resource control method that is executed by a base station in a mobile communication between the base station and each of a plurality of mobile stations. As shown in FIG. 9, the resource control method comprises: an unallocated resource measurement step (S01) of measuring an amount of unallocated resources, when one mobile station originates a new connection request or a handover request; a service quality calculation step (S02) of calculating a service quality which can be provided to the one mobile station with the amount of the unallocated resources obtained by the measurement; a decision step (S03) of deciding whether the service quality obtained by the calculation is within a predetermined range in accordance with a service class to which the one mobile station belongs; and a reassignment step (S04) of reassigning the resources to each mobile station depending on the service class to which each mobile station belongs, when the service quality is not within the predetermined range in accordance with the service class to which the one mobile station belongs (in a case where a negative decision is made in S03).

The resource control method according to the present invention is a resource control method that is executed by a base station in a mobile communication between the base station and each of aplurality of mobile stations. As shown in FIG. 10, the resource control method comprises: a service quality information collection step (S11) of collecting service quality information of each mobile station when some resources are released or at certain time intervals; a state decision step (S12) of checking for each mobile station, based on the collected service quality information of each mobile station, whether the service quality of each mobile station is within a predetermined range in accordance with the service class to which each mobile station belongs, and of deciding whether the service qualities for mobile stations of more than a predetermined ratio among the total mobile stations are not within the predetermined range in accordance with the service class to which each mobile station belongs; and a reassignment step (S13) of reassigning the resources to each mobile station depending on the service class to which each mobile station belongs, when the service qualities for the mobile stations of more than a predetermined ratio among the total mobile stations are not within the predetermined range depending on the service class to which each mobile station belongs (in a case where an affirmative decision is made in S12).

By each of the two resource control methods according to the present invention, the resources are reassigned depending on the service class to which the user belongs. Even when the total traffic capacitance varies, fairness of a service is kept by providing the resources of approximately an equal degree among the users of the same service class, and differentiation among the users of the different service classes is kept by maintaining a previously determined rate. Thus, the service with fairness can be provided. As described above, the service with fairness can be provided by achieving the fairness among the users of the same service class and among the users of the different service classes, thus enhancing the degree of user satisfaction.

Incidentally, in the foregoing reassignment step (S04 in FIG. 9 and S13 in FIG. 10), the base station preferably reassigns the resources to each mobile station specifically as described below.

For example, when other mobile stations belong to the same service class as that of the one mobile station, in the reassignment step, the base station should reassign the resources to each mobile station so that a service quality provided by a resource allocated to the one mobile station approximates to service qualities provided by resources allocated to the other mobile stations within a predetermined range.

Furthermore, when the other mobile stations belong to service classes different from that of the one mobile station, in the reassignment step, the base station should reassign the resources to each mobile station so that a rate of a service quality provided by a resource allocated to the one mobile station to those provided by resources allocated to the other mobile stations is within a predetermined range, a center of which is a predetermined value determined by the service class of the one mobile station and the service classes of the other mobile stations.

Furthermore, when a first mobile station belonging to the same service class as that of the one mobile station and a second mobile station belonging to a different service class from that of the one mobile station exist, the base station should reassign the resources to each mobile station in the reassignment step so that a service quality provided by a resource allocated to the one mobile station approximates to a service quality provided by a resource allocated to the first mobile station within a predetermined range and so that a rate of the service quality provided by the resource allocated to the one mobile station to a service quality provided by a resource allocated to the second mobile station is within a predetermined range, a center of which is a predetermined value determined by the service class of the one mobile station and the service class of the second mobile station.

As described above, the present invention according to the foregoing resource control method comprising the plurality of steps can be also described as an invention of a mobile communication system and a base station as follows.

Specifically, a mobile communication system according to the present invention is constituted by comprising: a base station; and a plurality of mobile stations located in a cell controlled by the base station, communicating with the base station, wherein the base station includes: unallocated resource measurement means for measuring an amount of unallocated resources, when one mobile station originates a new connection request or a handover request; service quality calculation means for calculating a service quality which can be provided to the one mobile station with the amount of the unallocated resources obtained by the measurement; decision means for deciding whether the service quality obtained by the calculation is within a predetermined range in accordance with a service class to which the one mobile station belongs; and reassignment means for reassigning the resources to each mobile station depending on the service class to which each mobile station belongs, when the service quality is not within the predetermined range in accordance with the service class to which the one mobile station belongs.

Furthermore, a mobile communication system according to the present invention is constituted by comprising: a base station; and a plurality of mobile stations located in a cell controlled by the base station, communicating with the base station, wherein the base station includes: service quality information collection means for collecting service quality information of each mobile station when some resources are released or at certain time intervals; state decision means for checking for each mobile station, based on the collected service quality information of each mobile station, whether the service quality of each mobile station is within a predetermined range in accordance with the service class to which each mobile station belongs, and for deciding whether the service qualities for mobile stations of more than a predetermined ratio among the total mobile stations are not within the predetermined range in accordance with the service class to which each mobile station belongs; and reassignment means for reassigning the resources to each mobile station depending on the service class to which each mobile station belongs, when the service qualities for the mobile stations of more than a predetermined ratio among the total mobile stations are not within the predetermined range in accordance with the service class to which each mobile station belongs.

On the other hand, the base station according to the present invention is a base station which communicates with each of a plurality of mobile stations located in a cell, the base station comprising: unallocated resource measurement means for measuring an amount of unallocated resources, when one mobile station originates a new connection request or a handover request; service quality calculation means for calculating a service quality which can be provided to the one mobile station with the amount of the unallocated resources obtained by the measurement; decision means for deciding whether the service quality obtained by the calculation is within a predetermined range in accordance with a service class to which the one mobile station belongs; and reassignment means for reassigning the resources to each mobile station depending on the service class to which each mobile station belongs, when the service quality is not within the predetermined range in accordance with the service class to which the one mobile station belongs.

Furthermore, the base station according to the present invention is a base station which communicates with each of a plurality of mobile stations located in a cell, the base station comprising: service quality information collection means for collecting service quality information of each mobile station when some resources are released or at certain time intervals; state decision means for checking for each mobile station, based on the collected service quality information of each mobile station, whether the service quality of each mobile station is within a predetermined range in accordance with the service class to which each mobile station belongs, and for deciding whether the service qualities for mobile stations of more than a predetermined ratio among the total mobile stations is not within the predetermined range in accordance with the service class to which each mobile station belongs; and reassignment means for reassigning the resources to each mobile station depending on the service class to which each mobile station belongs, when the service qualities for the mobile stations of more than a predetermined ratio among the total mobile stations is not within the predetermined range depending on the service class to which each mobile station belongs.

BRIEF DESCRIPTION OF THE DRAWINGS

FIG. 5A is a drawing for explaining resource assignment concerning a downlink communication when a new transmission request is originated in this embodiment.

FIG. 5B is a stacking graph of transmission power allocated to each mobile station of FIG. 5A.

FIG. 5C is a diagram for explaining resource assignment concerning an uplink communication when a new transmission request is originated in this embodiment.

FIG. 5D is a stacking graph of received power from each mobile station of FIG. 5C.

FIG. 11 is a table showing preconditions concerning the maximum and minimum request amounts of service classes 1 and 2.

FIG. 12A is a table showing an example of numerical values before the resource reassignment in the processing of FIG. 3.

FIG. 12B is a table showing an example of numerical values after the resource reassignment in the processing of FIG. 3.

FIG. 13A is a table showing an example of numerical values before the resource reassignment when the resources are left over in the processing of FIG. 4.

FIG. 13B is a table showing an example of numerical values after the resource reassignment when the resources are left over in the processing of FIG. 4.

FIG. 14A is a table showing an example of numerical values before the resource reassignment based on measurement results at certain time intervals in the processing of FIG. 4.

FIG. 14B is a table showing an example of numerical values after the resource reassignment based on measurement results at certain time intervals in the processing of FIG. 4.

DESCRIPTION OF THE PREFERRED EMBODIMENTS

Embodiments of the present invention will be described with reference to the accompanying drawings below. As shown in FIGS. 5A and 5C, a mobile communication system supposed in this embodiment is the one constituted by comprising a base station 10 and mobile stations 20 (hereinafter referred to as MS) located within a cell controlled by the base station 10, which communicates between the base station 10 and each mobile station 20. Note that a portable terminal such as a portable phone and a mobile terminal corresponds to the mobile station 20.

Figure 1:
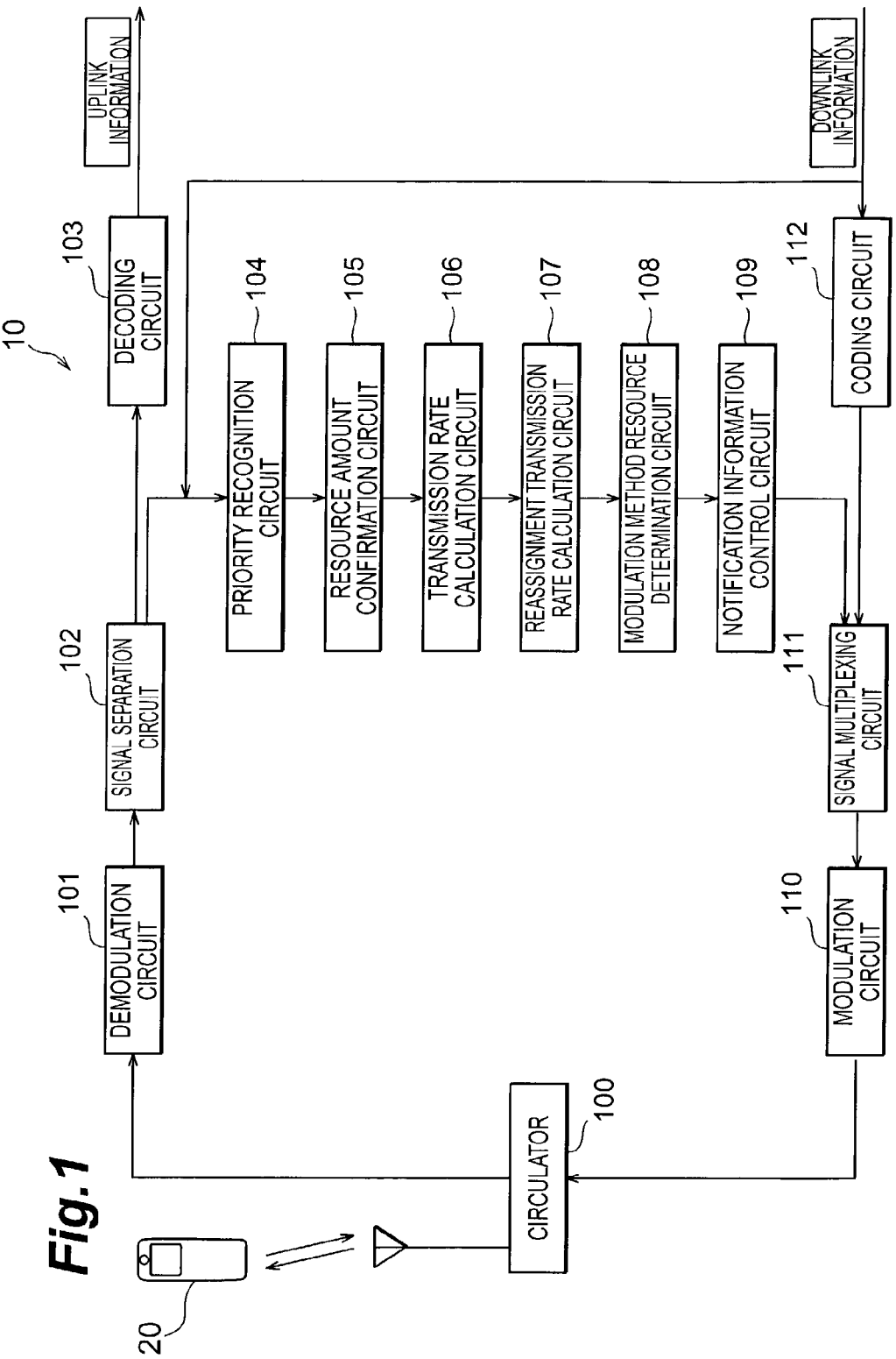
FIG. 1 is a constitutional view of a base station in an embodiment of the present invention.

A constitutional view illustrating a constitution example of the base station 10 is shown in FIG. 1. The base station 10 comprises a circulator 100; a demodulation circuit 101; a signal separation circuit 102; a priority recognition circuit 104 for recognizing a priority (service class) and the present communication quality (for example, a transmission rate and the like) concerning the mobile station 20 that is a communication partner; a remaining resource amount confirmation circuit 105 for confirming an amount of remaining resources; a transmission rate calculation circuit 106 for calculating a transmission rate that can be provided to the mobile station; a transmission rate calculation circuit 107 by a reassignment (hereinafter referred to as a reassignment transmission rate calculation circuit 107), which calculates a transmission rate by the reassignment when the transmission rate becomes lower than a previously set threshold value; a modulation method resource determination circuit 108 for determining a modulation method and an amount of radio resources; a notification information control circuit 109 which generates notification information for notifying the determined transmission rate, modulation method and amount of radio resources; a signal multiplexing circuit 111; a modulation circuit 110; a decoding circuit 103; and a coding circuit 112.

A transmission request transmitted from the mobile station 20 to the base station 10 in an uplink direction or a transmission request transmitted from a superordinate network to the base station 10 in a downlink direction is input to the priority recognition circuit 104 through the circulator 100, the decoding circuit 101 and the signal separation circuit 102. After a priority (service class) is recognized in the priority recognition circuit 104, an amount of remaining resources is confirmed by the remaining resource amount confirmation circuit 105, and a transmission rate that can be provided to this mobile station 20 is calculated by the transmission rate calculation circuit 106. If this transmission rate becomes lower than a previously set threshold value, the reassignment transmission rate calculation circuit 107 is started up, and a reassignment transmission rate is calculated by the reassignment transmission rate calculation circuit 107.

Furthermore, the modulation method and the amount of the radio resources are determined by the modulation method resource determination circuit 108. The determined modulation method, the determined amount of the radio resources and the transmission rate obtained by the foregoing calculation are input to the notification information control circuit 109 and the signal multiplexing circuit 111, and then are transmitted, together with downlink information transmitted through the decoding circuit 112, to the mobile station 20 through the modulation circuit 110 and the circulator 100.

The signal separation circuit 102, the priority recognition circuit 104, the remaining resource amount confirmation circuit 105, the transmission rate calculation circuit 106, the reassignment transmission rate calculation circuit 107, the modulation method resource determination circuit 108, the notification information control circuit 109 and the signal multiplexing circuit 111 may be provided between an input terminal of the decoding circuit 103 and an input terminal of the coding circuit 112, that is, on the right sides of the decoding circuit 103 and the coding circuit 112 in FIG. 1.

Note that recognition means provided in the foregoing base station according to the present invention corresponds to the priority recognition circuit 104; estimation means corresponds to the remaining resource amount confirmation circuit 105; determination means corresponds to the transmission rate calculation circuit 106, the reassignment transmission rate calculation circuit 107 and the modulation method resource determination circuit 108; and instruction means corresponds to the notification information control circuit 109.

Figure 2:
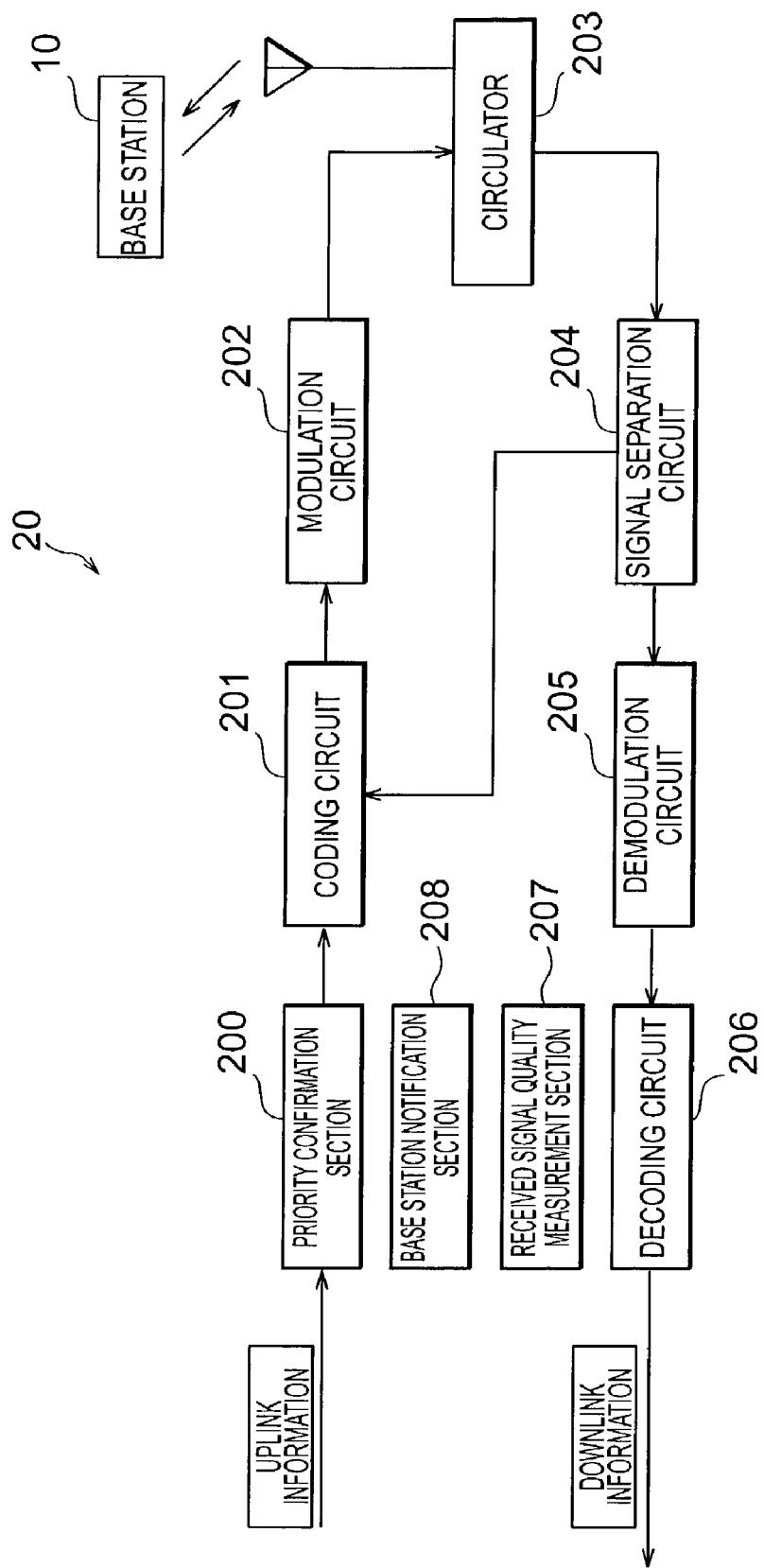
FIG. 2 is a constitutional view of a mobile station in the embodiment of the present invention.

A constitutional view showing a constitution example of the mobile station 20 is illustrated in FIG. 2. As shown in FIG. 2, the mobile station 20 comprises a priority confirmation section 200 for confirming a priority of a transmitted object; a coding circuit 201; a modulation circuit 202; a circulator 203; a signal separation circuit 204; a demodulation circuit 205; a decoding circuit 206; a received signal quality measurement section 207; and a base station notification section 208.

In the mobile station 20, the priority confirmation section 200 confirms the priority of the transmitted object. Together with the transmission request, this priority information is transmitted to the base station 10, which is illustrated in FIG. 1, through the coding circuit 201, the modulation circuit 202 and the circulator 203. This operation corresponds to the one of class notification means of the present invention. On the other hand, information concerning the amount of the radio resources, the modulation method and the transmission rate, which are determined by the base station 10, is input to the coding circuit 201 through the circulator 203 and the signal separation circuit 204. This operation corresponds to the one of recognition means. Subsequently, the packet of the transmitted object is modulated in the modulation circuit 202 depending on the amount of the radio resources and the modulation method, which were determined by the base station 10, and is transmitted to the base station 10 through the circulator 203. This operation corresponds to the one of transmission means. Furthermore, in the case of the downlink communication, information concerning both of the amount of the radio resources and the modulation method, which were determined by the base station 10, is acquired from the signal separation circuit 204, and is demodulated in the demodulation circuit 205 depending on the modulation method. Then, the information concerning both of the amount of the radio resources and the modulation method are decoded by the decoding circuit 206, and this information becomes a downlink information. These operations correspond to the ones of communication means. The received signal quality measurement section 207 measures a downlink received signal quality, and outputs a measurement result to the base station notification section 208. The base station notification section 208 notifies received signal quality information of the measurement result, for example, transmission rate information, to the base station 10 at certain time intervals. Note that the received signal quality measurement section 207 corresponds to service quality measurement means of the present invention, and the base station notification section 208 corresponds to service quality notification means of the present invention.

Next, a basic operation according to the resource control method by the base station, which is a feature of the present invention, will be described. Herein, a transmission rate is taken as an example of QoS, and, in terms of a priority, users shall be divided into two including a high service class (class 1) and a low service class (class 2). The class 1 shall indicate a user that requests a high transmission rate "rate_1", and the class 2 shall indicate a user that requests a low transmission rate "rate_2".

In the case of capacitance A of the resources in the system, when a user that originates a new connection request or a handover request belongs to class 1, and ((rate_now_i/rate_1)<1−α) or ((rate_now_i/rate_1)>1+α), or when this user belongs to class 2, and ((rate_now_i/rate_2)<1−α) or ((rate_now_i/rate_2)>1+α), the resources are reassigned. The value α is the permitted value for alteration of rate_now_i.

Note that a sum of users of the class 1 and class 2, including the user that originates the new connection request or the handover request, shall be N. In N, the number of users of the class 1 shall be J, and the number of users of the class 2 shall be K (J+K=N). "Total" indicates down or uplink total capacitance of the resources. A transmission rate that can be provided for each code of CDMA is represented by "rate_ch", and a target SIR is represented by "SIR_tg".

"Sum_idown" and "Sum_iup" are a downlink interference amount on the basis of MSi and an uplink interference amount on the basis of the base station, respectively. In the case of the downlink communication, transmission power "Power_ch_i" necessary for providing the transmission rate of rate_ch to the user i is calculated by the equation 1. Herein, "Attenuation" and "Shadow" represent distance attenuation and shadowing, respectively. On the other hand, in the case of the uplink communication, received power "Power_ch_i" in the base station, which is required for providing the transmission rate "rate_ch", is calculated by the equation 2. Subsequently, in both of the uplink and downlink communications, in the case where the remaining capacitance of the resources is A, it is possible to calculate a transmission rate, which can be provided to the user, by the equation 3.

$$\text{Power\_}ch\_i=(\text{SIR\_}tg \times \text{Sum\_}idown)/\text{Attenuation\_}i \times \text{Shadow\_}i \text{(downlink communication)} \quad (1)$$

$$\text{Power\_}ch\_i=\text{SIR\_}tg \times \text{Sum\_}iup \text{(uplink communication)} \quad (2)$$

$$\text{rate\_now\_}i=\text{rate\_}ch \times (A/\text{Power\_}ch\_i) \quad (3)$$

When this user belongs to class 1, and ((rate_now_i/rate_1)<1−α) or ((rate_now_i/rate_1)>1+α), or when this user belongs to class 2, and ((rate_now_i/rate_2)<1−α) or ((rate_now_i/rate_2)>1+α), the resources are reassigned. The value α is the permitted value for alteration of rate_now_i. A reassignment method will be described below.

$$rate\_1/rate\_2 = R \quad (4)$$

$$\sum_{i=1}^{J} rate\_1/rate\_ch \times Power\_ch\_i + \sum_{i=J+1}^{J+K} rate\_2/rate\_ch \times Power\_ch\_i = Total \quad (5)$$

"rate_1" and "rate_2" capable of satisfying the equations 4 and 5 are calculated, and the resource amount "rate_1 (or 2)/rate_ch×Power_ch_i" necessary for providing "rate_1" and "rate_2" to the users of the class 1 and class 2 are allocated.

Based on the foregoing basic operation, resource control processes of the base station at the time of the connection request (when a new connection request or a handover request is originated) and at the time of the resource reassignment in the event of occurrence of unallocated resource will be described sequentially.

Figure 3:
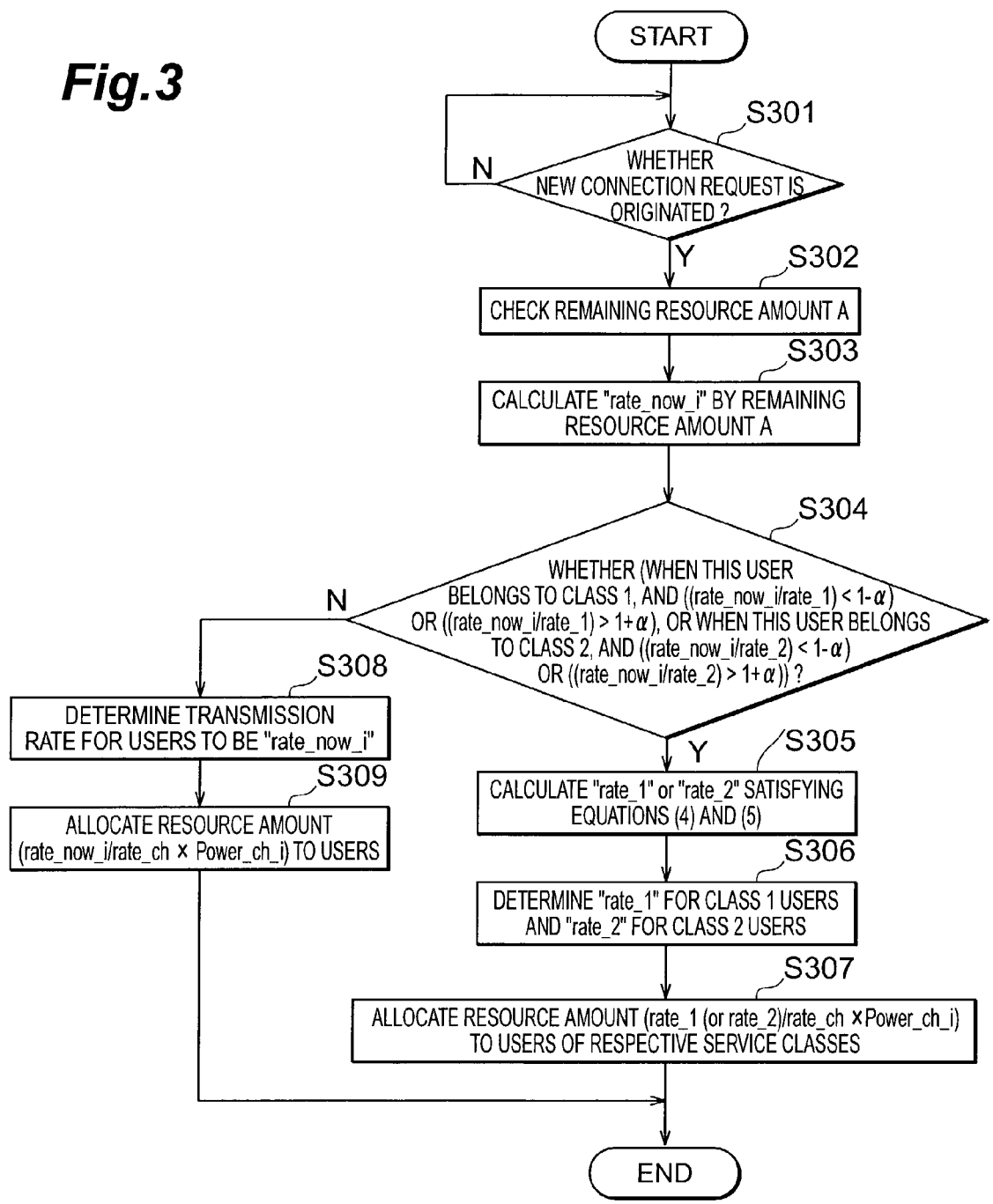
FIG. 3 is a flowchart illustrating processing executed by the base station at the time of a connection request (at the time when a new connection request or a handover request is originated).

In FIG. 3, a flow chart of an operation of the base station at the time of the connection request (when the new connection request or the handover request is originated) is illustrated.

The base station waits for the connection request (S301), and when the connection request is originated (affirmative decision in S301), the base station checks the remaining resource amount A that can be allocated (S302). Then, in a state where the remaining resource amount is A, the base station calculates QoS which can be provided to the mobile station that is the user who originated the connection request (S303). QoS is the transmission rate "rate_now_i", for example. Subsequently, the base station decides whether (when this user belongs to class 1, and ((rate_now_i/rate_1)<1−α) or ((rate_now_i/rate_1)>1+α), or when this user belongs to class 2, and ((rate_now_i/rate_2)<1−α) or ((rate_now_i/rate_2)>1+α)) or not (S304).

If neither (when this user belongs to class 1, and ((rate_now_i/rate_1)<1−α) or ((rate_now_i/rate_1)>1+α)), nor (when this user belongs to class 2, and ((rate_now_i/rate_2)<1−α) or ((rate_now_i/rate_2)>1+α)) (negative decision in S304), the base station determines the transmission rate of the mobile station that is the user who originated the connection request to be "rate_now_i" (S308), and allocates the resource amount (rate_now_i/rate_ch×Power_ch_i) to the mobile station (S309), the resource amount being necessary for providing "rate_now_i", thus finishing the process.

On the other hand, if (when this user belongs to class 1, and ((rate_now_i/rate_1)<1−α) or ((rate_now_i/rate_1)>1+α), or (when this user belongs to class 2, and ((rate_now_i/rate_2)<1−α) or ((rate_now_i/rate_2)>1+α)), the base station calculates "rate_1" and "rate_2" which satisfy the foregoing equations 4 and 5 (S305), and determines "rate_1" and "rate_2" for the users of the service classes 1 and 2, respectively (S306). Then, the base station allocates the resource amount (rate_1 (or 2)/rate_ch×Power_ch_i) to the users of the respective service classes (S307), the resource amount being necessary for providing the rates, and the base station completes the process. R described above is a previously determined value, and by varying the value of R, it is possible to adjust the degree of fairness among the users of the same service class and among the users of difference service classes.

Figure 4:
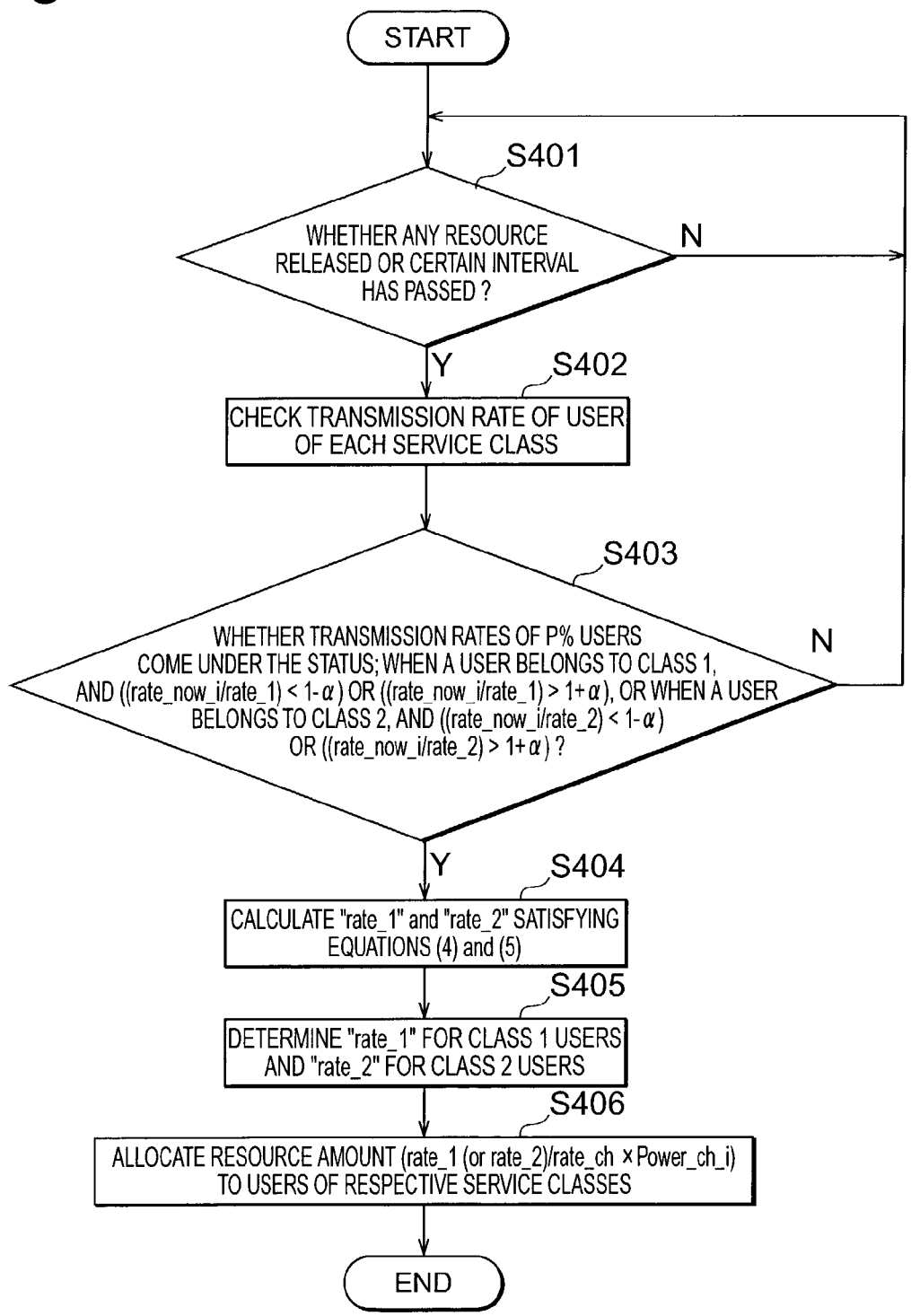
FIG. 4 is a flowchart illustrating a resource reassignment process executed by the base station when some resources are released or at certain time intervals.
Figure 6B:
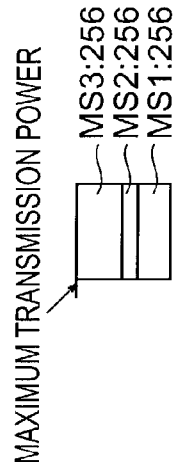
FIG. 6B is a stacking graph of transmission power allocated to each mobile station of FIG. 6A.
Figure 6A:
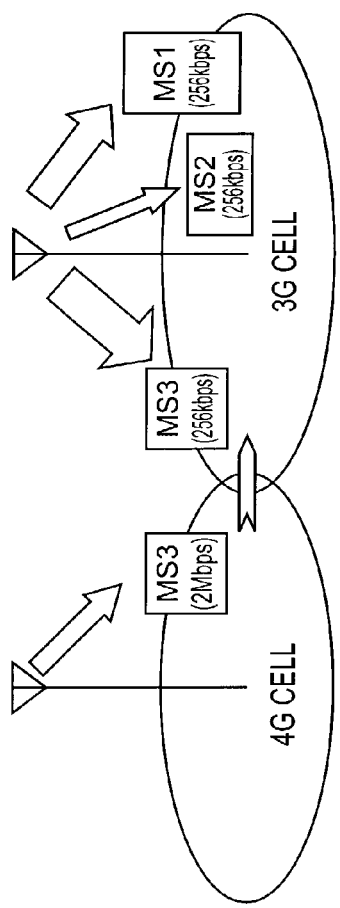
FIG. 6A is a diagram for explaining resource assignment concerning a downlink communication when a handover request is originated in this embodiment.
Figure 6D:
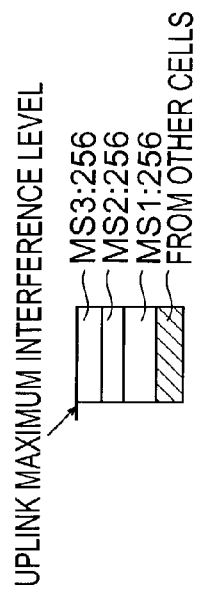
FIG. 6D is a stacking graph of received power from each mobile station of FIG. 6C.
Figure 6C:
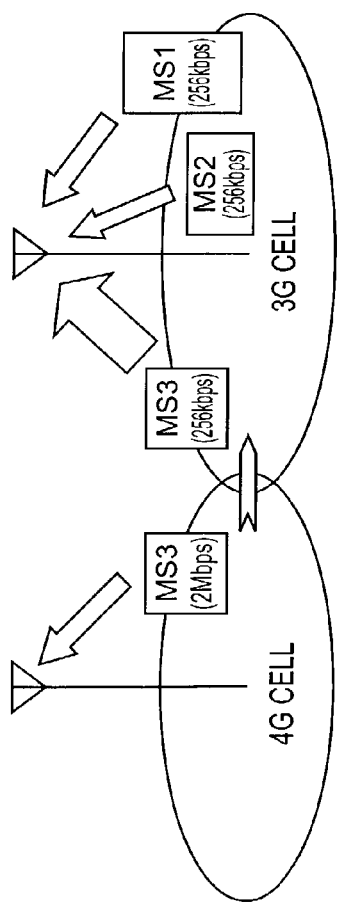
FIG. 6C is a diagram for explaining resource assignment concerning an uplink communication when the handover request is originated in this embodiment.
Figure 7A:
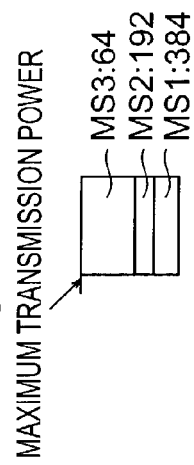
FIG. 7A is a diagram for explaining resource assignment concerning a downlink communication when a new transmission request is originated in a conventional system.
Figure 7B:
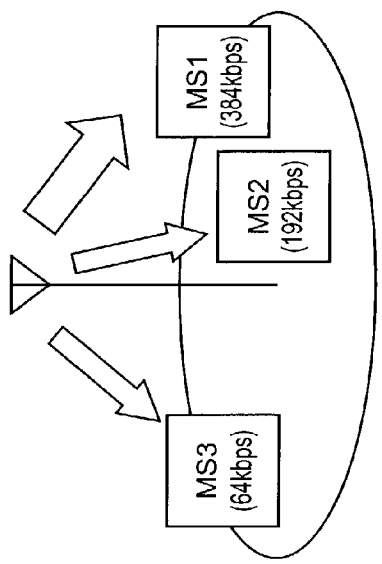
FIG. 7B is a stacking graph of transmission power allocated to each mobile station of FIG. 7A.
Figure 7C:
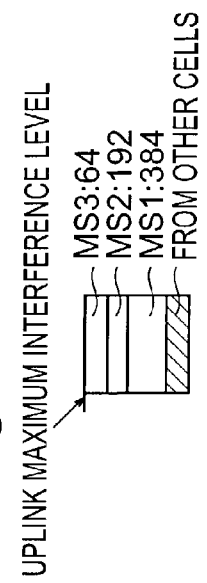
FIG. 7C is a diagram for explaining resource assignment concerning an uplink communication when the new transmission request is originated in the conventional system.
Figure 7D:
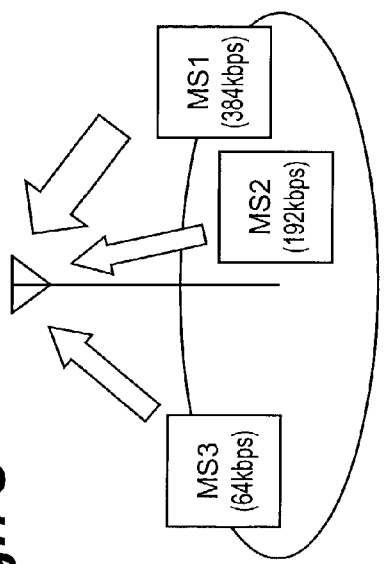
FIG. 7D is a stacking graph of received power from each mobile station of FIG. 7C.
Figure 8B:
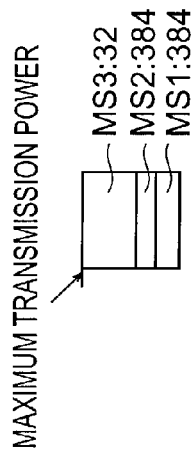
FIG. 8B is a stacking graph of transmission power allocated to each mobile station of FIG. 8A.
Figure 8A:
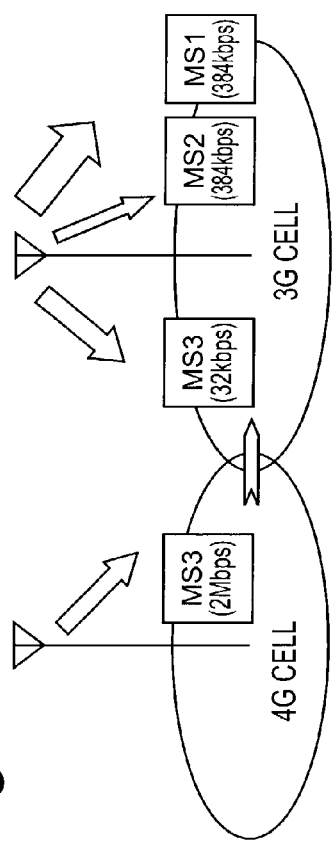
FIG. 8A is a drawing for explaining resource assignment concerning a downlink communication when a handover request is originated in a conventional system.
Figure 8D:
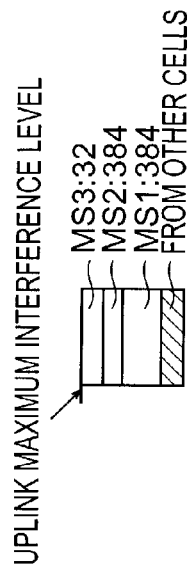
FIG. 8D is a stacking graph of received power from each mobile station of FIG. 8C.
Figure 8C:
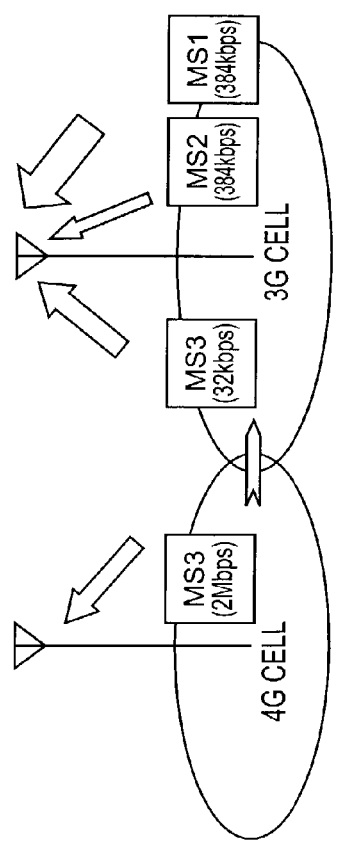
FIG. 8C is a diagram for explaining resource assignment concerning an uplink communication when the handover transmission request is originated in the conventional system.
Figure 9:
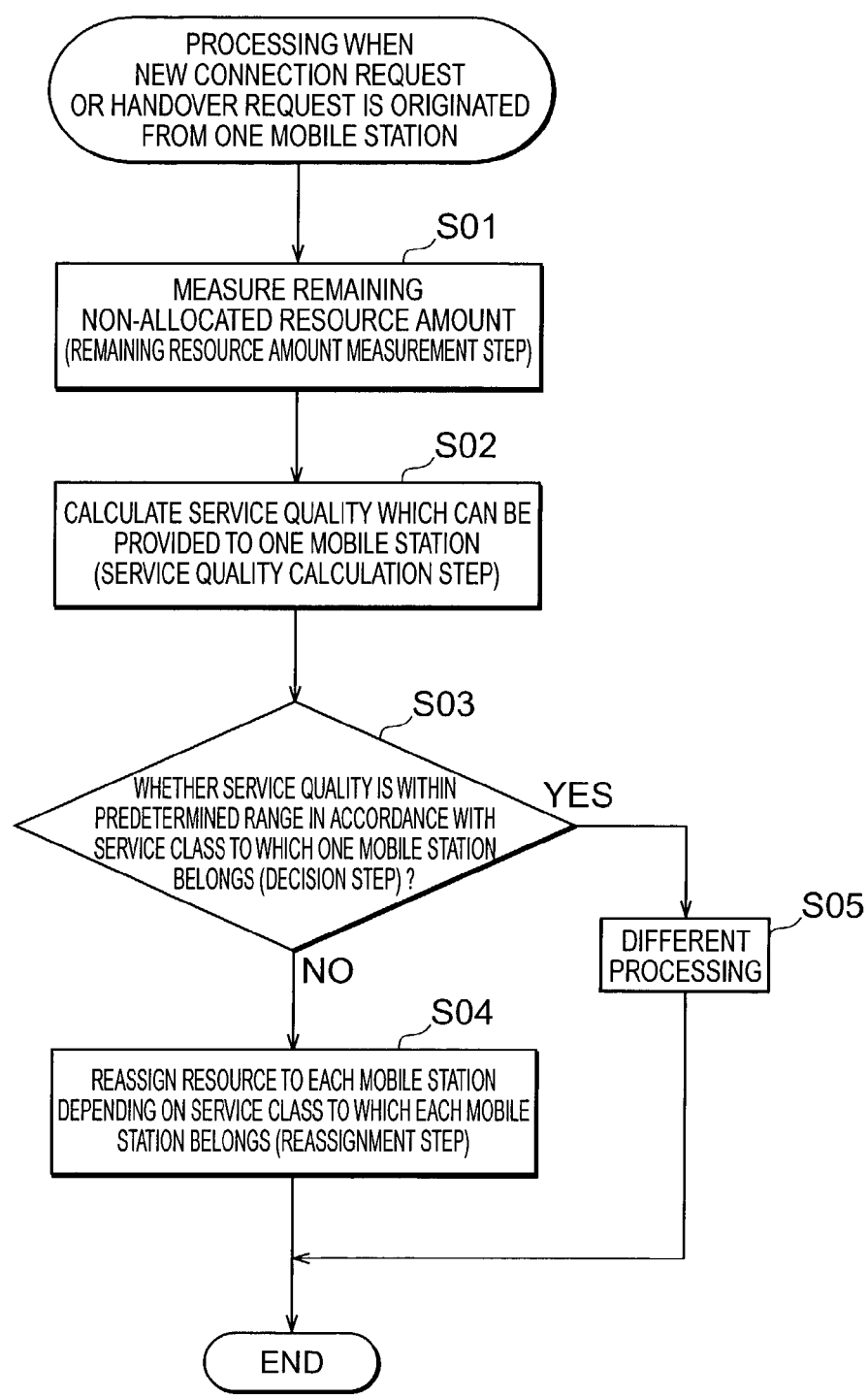
FIG. 9 is a flowchart illustrating a first embodiment of a resource control method according to the present invention.
Figure 10:
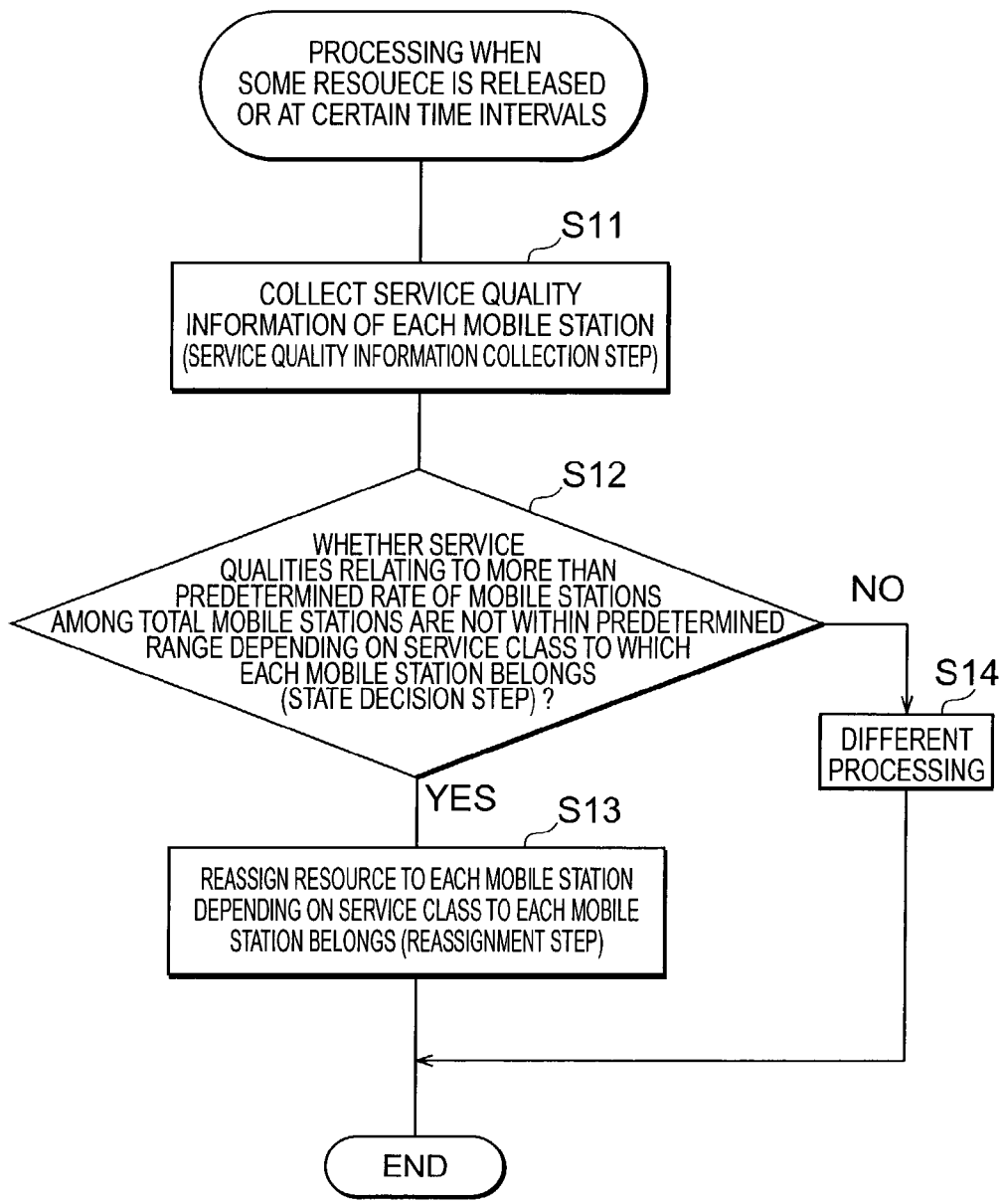
FIG. 10 is a flowchart illustrating a second embodiment of the resource control method according to the present invention.

FIG. 4 illustrates a flowchart of a resource reassignment operation of the base station at the time when some resources are released and at the time when a certain time interval has passed.

In the base station, it is monitored whether any resources are released or whether the certain time interval has passed (S401). If some resources are released or if the certain time interval has passed, the transmission rate of the user of each service class is checked (S402). Then, it is decided whether the transmission rates of the users of P% among the total users come under the next status; (when a user belongs to class 1, and ((rate_now_i/rate_1)<1−α) or ((rate_now_i/rate_1)>1+α)), or (when a user belongs to class 2, and ((rate_now_i/rate_2)<1−α) or ((rate_now_i/rate_2)>1+α)) (S403).

Herein, if a negative decision is made, the process returns to S401. On the other hand, if the transmission rates of the users of P% among the total users come under the above-mentioned status, "rate_1" and "rate_2" which satisfy the foregoing equations 4 and 5 are calculated (S404), and "rate_1" and "rate_2" are determined for the users of the service classes 1 and 2, respectively (S405). Then, the resource amount (rate_1 (or 2)/rate_ch×Power_ch_i) necessary for providing each of the transmission rates "rate_1" and "rate_2" is allocated to the user of each service class (S406), and the process is finished. Both of R and percentage P, which are described above, represent previously determined values. By varying either both of R and P or one of R and P, it is possible to adjust the degree of fairness among users of the same service class and among users of difference service classes.

Images of the transmission rates after the reassignments by the processing of this embodiment described above are illustrated in FIGS. 5A to 5D and FIGS. 6A to 6D. For example, as shown in FIGS. 5A to 5D, MS1 and MS3 shall belong to a high service class requesting a high transmission rate, and MS2 shall belong to a low service class requesting a low transmission rate. Note that FIG. 5A illustrates the downlink communication from the base station to the mobile station, and FIG. 5C illustrates the uplink communication from the mobile station to the base station.

The thickness of the arrows in FIG. 5A shows a magnitude of transmission power allocated to each MS, and a stacking graph of the transmission power allocated to each MS is illustrated in FIG. 5B. The thickness of the arrows in FIG. 6A to be described later similarly shows a magnitude of transmission power allocated to each MS, and a stacking graph of the transmission power allocated to each MS is similarly illustrated in FIG. 6B. Furthermore, the thickness of the arrows in FIG. 5C illustrates a magnitude of received power relating to a received signal from each MS, and a stacking graph of the received power from each MS is also illustrated in FIG. 5D. The thickness of the arrows in FIG. 6C to be described later similarly shows a magnitude of received power from each MS, and a stacking graph of the received power from each MS is similarly illustrated in FIG. 6D.

When a new transmission request is originated in MS3 in a state where resources are allocated only to MS1 and MS2, the resource reassignment is performed even if the remaining resource is short. The resources are allocated to MS1 and MS3 that are users of the same service class so that transmission rates of 256 kbps can be realized, and the resources are allocated to MS2 that is a user of a low service class so that a transmission rate of 128 kbps can be realized.

As described above, by reassigning the resources according to necessity, a service quality of the same degree can be provided to the users of the same class, and a rate of the service quality is kept to be a certain value for the users of the difference service classes, whereby QoS with fairness can be provided.

This reassignment can be applied to the case where a handover request is originated. Specifically, as shown in FIGS. 6A to 6D, assuming that MS1 to MS3 be users of the same service class, when the handover request is originated from MS3 accompanied with movement in a state where the resources are allocated only to MS1 and MS2, the resource reassignment is performed even if the remaining resource is short. Accordingly, the resources are allocated to MS1 to MS3, which are the users of the same service class, so that a transmission rate of 256 kbps can be realized. Also in this case, QoS with fairness can be provided by providing the service quality of the same degree to the users of the same service class. Particularly, it is possible to reduce a quality difference among the users of the same service class during handover between 3G and 4G cells with a large capacitance difference therebetween.

Herein, supplementary descriptions will be made for the above-described processes of FIG. 3 and FIG. 4 by using specific numerical values.

First, preconditions will be described. In FIG. 11, the maximum and minimum request amounts of the service classes 1 and 2 are shown. It is assumed that a transmission rate for each code is 500 kbps and capacitance W of the total cells is 10 Mbps. Moreover, a rate R of the class 2 to the class 1 shall be 2. As an example of the service quality QoS, a transmission rate is an object to be discussed. In the foregoing embodiment, according to the equation 5, the downlink communication is established on the premise that a sum of the transmission power allocated to the respective users is equal to the total transmission power of the base station, and the uplink communication is established on the premise that the total received power from the respective users is equal to a sum of allowable received power of the base station. Herein, for the sake of simplicity of explanations, both of the up and downlink communications shall be established on the premise that the sum of transmission rates allocated to the respective users is equal to total cell capacitance from the viewpoint of cell capacitance.

Next, descriptions will be made for numerical examples concerning the processing of FIG. 3.

In FIG. 12A, classes of users, an origination order of requests from the users and allocated transmission rates are illustrated. The users A and C shall be the ones belonging to the class 1, and the user B shall be the one belonging to the class 2. The origination of the requests shall be performed in the order of A, B and C. When the user A originated a new connection request, 3 Mbps that is the maximum request was allocated to the user A because no resource was not yet allocated. Thereafter, when the user B originated a new connection request, 6 Mbps that is the maximum request for the user B was allocated to the user B because the remaining resource amount was more than the maximum request of the user B. Furthermore, when the user C originated a new connection request in this state, 1 Mbps that is the minimum request for the user C was allocated to the user C because the remaining resource was only 1 Mbps. In this case, the disparity of the service between the users A and C of the same service class is large, and, with respect to the users B and C of the different service classes, the rate of the transmission rate of the user C to the user B is as high as 6 times.

Herein, a resource reassignment method when the present invention is applied thereto will be described. Allocation rates of the users of the classes 1 and 2 after the reassignment shall be r1 and r2. In the equation 6, R indicates a rate of the transmission rate among the service classes. In the equation 7, N1 and N2 indicate the number of the users belonging to the service classes 1 and 2, respectively, and W indicates capacitance of the total cells.

$$r1/r2=R \qquad (6)$$

$$N1 \times r1 + N2 \times r2 = W \qquad (7)$$

In this case, by substituting N1=2 and N2=1 for the equation 7, r1=2.5 Mbps and r2=5 Mbps are obtained from the equations 6 and 7. Specifically, the transmission rate that can be provided to the user of the class 1 is 2.5 Mbps by allocating 5 codes to the user of the class 1, and the transmission rate that can be provided to the user of the class 2 is 5 Mbps by allocating 10 codes to the user of the class 2.

Transmission rates which were allocated to the respective users upon the application of the present invention are shown in FIG. 12B. As is understood from FIG. 12B, the services of approximately an equal degree can be provided to the users A and C of the class 1. Furthermore, the rate R of the transmission rates between the users A and C of the class 1 is maintained so as to be 2, which is previously determined. In the above-described manner, services with fairness can be provided and the degree of user satisfaction can be enhanced by achieving fairness among the users of the same class and among the users of the different classes.

Next, a case where the resources are left will be described as a numerical example concerning the processing of FIG. 4. As an example, when a state where the allocation of the transmission rates to the users of the class 1 is not within a range of 1.6 to 2.4 Mbps, the center of which is 2 Mbps, as well as a state where the allocation of the transmission rates to the users of the class 2 is not within a range of 3.2 to 4.8 Mbps, the center of which is 4 Mbps, occur for 50% or more of the total users, an affirmative decision shall be performed in S403 of FIG. 4, that is, a decision to perform the resource reassignment shall be made.

In FIG. 13A, the transmission rates of the respective users before the allocation of the transmission rate to the user A is finished are shown. In this event, since 1.5 Mbps is allocated to the user C of the class 1 and 3 Mbps is allocated to the users B and C of the class 2, the foregoing states occur for all users (100% of the users). Therefore, the affirmative decision is made in S403 of FIG. 4, and then processes concerning the reassignment of the resource after S404 are executed. In this case, since the numbers N1 and N2 of the users of the classes 1 and 2 are respectively 1 and 2 after completion of the allocation of the user A, r2 is 4 Mbps and r1 is 2 Mbps with use of the foregoing equations 6 and 7.

In FIG. 13B, the transmission rates allocated to the respective users upon the application of the present invention are shown. As is clear from FIG. 13B, the services of approximately an equal degree can be provided to the users B and D of the class 2. Furthermore, the rate R of the transmission rates between the users B and D of the class 2 and the user C of the class 1 is maintained so as to be 2 that is previously determined. In the above-described manner, services with fairness can be provided and the degree of user satisfaction can be enhanced by achieving fairness among the users of the same class and among the users of the different classes.

Finally, a case where, as a result of measurements of the transmission rates allocated to the users at certain time intervals, it is decided that the resource reassignment needs to be performed will be described as a numerical example concerning the processing of FIG. 4. Herein, as an example, when a state where the allocation of the transmission rates to the users of the class 1 is not within a range of 1.4 to 2.6 Mbps, the center of which is 2 Mbps, as well as a state where the allocation of the transmission rates to the users of the class 2 is not within a range of 2.8 to 5.2 Mbps, the center of which is 4 Mbps, occur for 50% or more of the total users, an affirmative decision shall be performed in S403 of FIG. 4, that is, a decision to perform the resource reassignment shall be made. In this example, capacitance W of the total cells shall be 9 Mbps.

In FIG. 14A, the transmission rates allocated to the respective users before the reassignment are shown. Since 3 Mbps is allocated to the users B and D of the class 2 at this time, the above-described states do not occur. However, since only 1 Mbps is allocated to the users A and C of the class 1, the foregoing states occur. Specifically, since the foregoing states occur for 50% of all users, the affirmative decision is performed in S403 of FIG. 4, and the processes concerning the reassignment of the resource after S404 are executed. In this case, since both of the numbers N1 and N2 of the users of the classes 1 and 2 are 2 and capacitance W is 9 Mbps, r2 is 3 Mbps and r1 is 1.5 Mbps with use of the foregoing equations 6 and 7.

In FIG. 14B, the transmission rates allocated to the respective users upon the application of the present invention are shown. As is clear from FIG. 14B, the services of approximately an equal degree can be provided to the users A and C of the class 1 as well as to the users B and D of the class 2. Furthermore, the rate R of the transmission rates between the users B and D of the class 2 and the users A and C of the class 1 is maintained so as to be 2 that is previously determined. In the above-described manner, services with fairness can be provided and the degrees of user satisfaction can be enhanced by achieving fairness among the users of the same class and among the users of the different classes.

In the foregoing embodiment of the present invention, the embodiment where the two service classes are provided was described. However, embodiments in which three or more service classes are provided are also applicable.

As described above, according to the present invention, the resources are reassigned depending on the service class to which the user belongs. Even when the total traffic capacitance varies, the resources of approximately an equal degree are provided to the users of the same service class. Thus, the fairness of the service is maintained, and the discrimination of the service class among the users of the different service classes is kept by maintaining the predetermined rate. Thus, it is possible to provide the service with fairness.

As described above, the service with fairness can be provided by achieving the fairness for the users of the same service class and for the users of the different service classes, thus enhancing the degree of the user satisfaction. Particularly, in the handover between the 3G and 4G cells of the large capacitance difference, it ispossible to reduce the quality difference among the users of the same service class.

What is claimed is:

1. A mobile station which communicates with a base station, the mobile station comprising:
   notification means for notifying to the base station a service class to which the mobile station belongs;
   service quality measurement means for measuring a present service quality at the time of a new connection, at the time of a handover and at certain time intervals;
   service quality notification means for notifying the service quality obtained by the measurement to the base station;
   recognition means for recognizing an amount of resources and a transmission rate, which are instructed by the base station; and
   communication means for communicating with the base station based on the amount of resources and the transmission rate which are instructed.

2. A resource control method which is executed by a base station in a mobile communication between the base station and each of a plurality of mobile stations, comprising:
   an unallocated resource measurement step of measuring an amount of unallocated resources, when one mobile station originates a new connection request or a handover request;
   a service quality calculation step of calculating a service quality which can be provided to the one mobile station with the amount of the unallocated resources obtained by the measurement;
   a decision step of deciding whether the service quality obtained by the calculation is within a predetermined range in accordance with a service class to which the one mobile station belongs; and
   a reassignment step of reassigning the resources to each mobile station depending on the service class to which each mobile station belongs, when the service quality is not within the predetermined range in accordance with the service class to which the one mobile station belongs.

3. The resource control method according to claim 2, wherein
   in the reassignment step, when other mobile stations belong to the same service class as that of the one mobile station, the resources are reassigned to each mobile station so that a service quality provided by a resource allocated to the one mobile station approximates to service qualities provided by resources allocated to the other mobile stations within a predetermined range.

4. The resource control method according to claim 2, wherein
   in the reassignment step, when other mobile stations belong to different service classes from that of the one mobile station, the resources are reassigned to each mobile station so that a rate of a service quality provided by a resource allocated to the one mobile station to those provided by resources allocated to the other mobile stations is within a predetermined range, a center of which is a predetermined value determined by the service class of the one mobile station and the service classes of the other mobile stations.

5. The resource control method according to claim 2, wherein
   in the reassignment step, when a first mobile station belonging to the same service class as that of the one mobile station and a second mobile station belonging to a different service class from that of the one mobile station exist, the resources are reassigned to each mobile station so that a service quality provided by a resource allocated to the one mobile station approximates to a service quality provided by a resource allocated to the first mobile station within a predetermined range, and so that a rate of the service quality provided by the resource allocated to the one mobile station to a service quality provided by a resource allocated to the second mobile station is within a predetermined range, a center of which is a predetermined value determined by the service class of the one mobile station and the service class of the second mobile station.

6. A resource control method which is executed by a base station in a mobile communication between the base station and each of a plurality of mobile stations, comprising:

a service quality information collection step of collecting service quality information of each mobile station when some resources are released or at certain time intervals;

a state decision step of checking for each mobile station, based on the collected service quality information of each mobile station, whether the service quality of each mobile station is within a predetermined range depending on the service class to which each mobile station belongs, and of deciding whether the service qualities for mobile stations of more than a predetermined ratio among the total mobile stations are not within a predetermined range in accordance with the service class to which each mobile station belongs; and a reassignment step of reassigning the resources to each mobile station depending on the service class to which each mobile station belongs, when the service qualities for the mobile stations of more than the predetermined ratio among the total mobile stations are not within the predetermined range in accordance with the service class to which each mobile station belongs.

7. The resource control method according to claim 6, wherein in the reassignment step, when other mobile stations belong to the same service class as that of the one mobile station, the resources are reassigned to each mobile station so that a service quality provided by a resource allocated to the one mobile station approximates to service qualities provided by resources allocated to the other mobile stations within a predetermined range.

8. The resource control method according to claim 6, wherein in the reassignment step, when other mobile stations belong to different service classes from that of the one mobile station, the resources are reassigned to each mobile station so that a rate of a service quality provided by a resource allocated to the one mobile station to those provided by resources allocated to the other mobile stations is within a predetermined range, a center of which is a predetermined value determined by the service class of the one mobile station and the service classes of the other mobile stations.

9. The resource control method according to claim 6, wherein in the reassignment step, when a first mobile station belonging to the same service class as that of the one mobile station and a second mobile station belonging to a different service class from that of the one mobile station exist, the resources are reassigned to each mobile station so that a service quality provided by a resource allocated to the one mobile station approximates to a service quality provided by a resource allocated to the first mobile station within a predetermined range, and so that a rate of the service quality provided by the resource allocated to the one mobile station to a service quality provided by a resource allocated to the second mobile station is within a predetermined range, a center of which is a predetermined value determined by the service class of the one mobile station and the service class of the second mobile station.

10. A mobile communication system, comprising:

a base station; and a plurality of mobile stations located in a cell controlled by the base station, communicating with the base station, wherein the base station includes:

unallocated resource measurement means for measuring an amount of unallocated resources, when one mobile station originates a new connection request or a handover request;

service quality calculation means for calculating a service quality which can be provided to the one mobile station with the amount of the unallocated resources obtained by the measurement;

decision means for deciding whether the service quality obtained by the calculation is within a predetermined range in accordance with a service class to which the one mobile station belongs; and reassignment means for reassigning the resources to each mobile station depending on the service class to which each mobile station belongs, when the service quality is not within the predetermined range in accordance with the service class to which the one mobile station belongs.

11. A mobile communication system, comprising:

a base station; and a plurality of mobile stations located in a cell controlled by the base station, communicating with the base station, wherein the base station includes:

service quality information collection means for collecting service quality information of each mobile station when some resources are released or at certain time intervals;

state decision means for checking for each mobile station, based on the collected service quality information of each mobile station, whether the service quality of each mobile station is within a predetermined range depending on the service class to which each mobile station belongs, and for deciding whether the service qualities for mobile stations of more than a predetermined ratio among the total mobile stations are not within a predetermined range in accordance with the service class to which each mobile station belongs; and reassignment means for reassigning the resources to each mobile station depending on the service class to which each mobile station belongs, when the service qualities for the mobile stations of more than the predetermined ratio among the total mobile stations are not within the predetermined range in accordance with the service class to which each mobile station belongs.

12. A base station which communicates with each of a plurality of mobile stations located in a cell, the base station comprising:

unallocated resource measurement means for measuring an amount of unallocated resources, when one mobile station originates a new connection request or a handover request;

service quality calculation means for calculating a service quality which can be provided to the one mobile station with the amount of the unallocated resources obtained by the measurement;

decision means for deciding whether the service quality obtained by the calculation is within a predetermined range in accordance with a service class to which the one mobile station belongs; and reassignment means for reassigning the resources to each mobile station depending on the service class to which each mobile station belongs, when the service quality is not within the predetermined range in accordance with the service class to which the one mobile station belongs.

13. A base station which communicates with each of a plurality of mobile stations located in a cell, the base station comprising:

service quality information collection means for collecting service quality information of each mobile station when some resources are released or at certain time intervals;

state decision means for checking for each mobile station, based on the collected service quality information of each mobile station, whether the service quality of each mobile station is within a predetermined range depending on the service class to which each mobile station belongs, and for deciding whether the service qualities for mobile stations of more than a predetermined ratio among the total mobile stations are not within a predetermined range in accordance with the service class to which each mobile station belongs; and reassignment means for reassigning the resources to each mobile station depending on the service class to which each mobile station belongs, when the service qualities for the mobile stations of more than the predetermined ratio among the total mobile stations are not within the predetermined range in accordance with the service class to which each mobile station belongs.

* * * * *